United States Patent
Shimizu et al.

(10) Patent No.: US 8,482,537 B2
(45) Date of Patent: Jul. 9, 2013

(54) PROTECTION PANEL HAVING TOUCH INPUT FUNCTION OF ANALOG RESISTANCE FILM METHOD

(75) Inventors: Jun Shimizu, Moriyama (JP); Toshiyuki Iwai, Hirakata (JP); Mitsutoyo Toshihara, Kyoto (JP); Kazuhiro Nishikawa, Uji (JP); Yoshihiro Kai, Nagaokakyo (JP)

(73) Assignee: Nissha Printing Co., Ltd., Kyoto (JP)

( * ) Notice: Subject to any disclaimer, the term of this patent is extended or adjusted under 35 U.S.C. 154(b) by 474 days.

(21) Appl. No.: 12/674,324

(22) PCT Filed: Aug. 19, 2008

(86) PCT No.: PCT/JP2008/064737
§ 371 (c)(1),
(2), (4) Date: May 3, 2010

(87) PCT Pub. No.: WO2009/025269
PCT Pub. Date: Feb. 26, 2009

(65) Prior Publication Data
US 2011/0267301 A1   Nov. 3, 2011

(30) Foreign Application Priority Data
Aug. 22, 2007   (JP) .................................. 2007-216220

(51) Int. Cl.
*G06F 3/041*   (2006.01)
(52) U.S. Cl.
USPC ........ 345/173; 345/174; 200/181; 178/18.01; 178/18.05; 178/18.06; 178/18.07

(58) Field of Classification Search
USPC .... 345/173–174, 156, 163; 178/18.01–18.09; 200/181
See application file for complete search history.

(56) References Cited

U.S. PATENT DOCUMENTS

| | | |
|---|---|---|
| 5,589,857 A | 12/1996 | Tanahashi et al. |
| 2004/0135940 A1 | 7/2004 | Tsunekawa et al. |

FOREIGN PATENT DOCUMENTS

| | | |
|---|---|---|
| JP | 07160401 A | 6/1995 |
| JP | 09044289   | 2/1997 |
| JP | 10260769 A | 9/1998 |
| JP | 2002202849 A | 7/2002 |
| TW | I252363 | 4/2006 |

*Primary Examiner* — Lun-Yi Lao
*Assistant Examiner* — Shaheda Abdin
(74) *Attorney, Agent, or Firm* — The Webb Law Firm

(57) ABSTRACT

A protection panel having a touch input function of the analog resistance film method for detecting an X-Y coordinate representing an operated position by a potential gradient based on a touch operation relative to the front substrate 6, in which the back substrate 5 and the front substrate 6 include contacts 5G and 6G, respectively, connected to each other in series on the resistance films 5A and 6A through the routing circuits 5C and 6C to have potential difference, in which the contacts 5G and 6G face each other at a predetermined distance when the back substrate 5 and the front substrate 6 are connected to each other, and in which a switch 12 is provided for detecting, when voltage is applied by the contacts 5G and 6G between the electrodes 5D or 6D of either one of the front substrate 6 and the back substrate 5, whether or not the contacts 5G and 6G are brought into contact with each other based on voltage detected by the electrodes 5D or 6D of the other of the front substrate 6 and the back substrate 5.

1 Claim, 5 Drawing Sheets

Fig.5

PROTECTION PANEL HAVING TOUCH INPUT FUNCTION OF ANALOG RESISTANCE FILM METHOD

TECHNICAL FIELD

The present invention relates to a protection panel having a touch input function of the analog resistance film method, comprising a back substrate having a front surface provided with a resistance film, a pair of bus bars arranged in opposed sides of the resistance film, a pair of routing circuits each connected to each of the bus bars at one end thereof, and a pair of electrodes each connected to the other end of each of the routine circuits, and a front substrate having a back surface provided with a resistance film, a pair of bus bars arranged in opposed sides of the resistance film, a pair of routing circuits each connected to each of the bus bars at one end thereof, and a pair of electrodes each connected to the other end of each of the routine circuits, wherein the back substrate and the front substrate are connected to each other to allow their resistance films to face each other at a predetermined distance and to allow either one of the pairs of bus bars to be arranged on opposed sides of the resistance film in an X-axis direction while the other of the pairs of bus bars to be arranged on opposed sides of the resistance film in a Y-axis direction, thereby to form a touch input section for detecting an X-Y coordinate representing an operated position by a potential gradient based on a touch operation relative to the front substrate.

BACKGROUND ART

The protection panel as noted above is provided in an electronic device such as a mobile phone, a smartphone, a PDA, car navigation equipment, a digital camera, a digital video camera, a portable gaming device, and a tablet, for example, to allow the user to perform a touch input operation in response to a display while protecting a display part of a display device provided in the electronic device.

Some recent models of the mobile phone and smartphone which are the examples of the electronic device having the above-noted protection panel include a texting function and an Internet function in addition to the original phone function, and further a photographing function and a music playback function. With such a multifunctional electronic device, it has been considered to improve the operability by providing a switch that is operable in response to those functions in the protection panel.

The protection panel of the above-noted type typically includes a plurality of function keys (switches) having a plurality of first contacts that are arranged electrically in m rows and n columns (M≧2, N≧2) in matrix, and a plurality of second contacts that are arranged to face the first contacts, correspondingly, in which the units of the first contacts arranged in a Y-axis direction are connected, per unit, to different points defined in an X-axis direction of a first surface resistive element (resistance film), while the units of the plurality of second contacts arranged in the X-axis direction are connected, per unit, to a plurality of (two) third terminals (electrodes) (see Patent Document 1, for example).

Another example of the protection panel includes a plurality of additional input sections (switches) in which a first conductive panel (front substrate) and a second conductive panel (back substrate) are connected to each other so that a first input area of a first transparent electrode (resistance film) provided in the first conductive panel faces a second input area of a second transparent electrode (resistance film) provided in the second conductive panel at a predetermined distance, and a third input area of the first transparent electrode provided in the first conductive panel faces at least one of a pair of second bus bars provided in the second conductive panel with a predetermine gap (see Patent Document 2, for example).

[Patent Document 1] Japanese Unexamined Patent Application Publication No. 9-44289
[Patent Document 2] Japanese Unexamined Patent Application Publication No. 2002-202849

DISCLOSURE OF THE INVENTION

With the former prior art arrangement noted above, when any one of the switches is operated, the Y-coordinate of the operated switch is determined by detecting one of the plurality of electrodes for the switches (third terminals) that outputs the voltage applied between the electrodes corresponding to the X-axis direction of the resistance film. On the other hand, the X-coordinate of the operated switch is determined based on the volume of the voltage outputted from the electrode for the operated switch.

More particularly, with the former prior art arrangement, the X-Y coordinate of the operated switch is determined by applying voltage between the electrodes corresponding to the X-axis direction of the resistance film.

However, in such an arrangement, it is required to additionally form a plurality of routing circuits extending from the resistance film to the corresponding contacts (first contacts), a plurality of electrodes (third terminals), and a plurality of routing circuits extending to the corresponding contacts (second contacts and third contacts) in the peripheries of the resistance film in order to provide the plurality of switches. Therefore, it is necessary to secure a large area in the peripheries of the resistance film for providing the plural routing circuits for the switches additionally and to form complicated circuitry. Thus, when the former prior art arrangement is applied to the protection panel, the protection panel becomes larger or the circuitry becomes complicated.

On the other hand, with the latter prior art arrangement, the plurality of switches can be provided using an area in which the bus bar (second bus bar) that has not been used conventionally as an input area is formed. In other words, the plurality of switches can be provided without forming any additional routing circuits for the switches in the peripheries of the resistance film as in the former prior art arrangement.

However, the latter prior art arrangement limits a degree of freedom of the switch arrangement because of the use of the bus bar-forming area in order to provide the plurality of switches. Further, in order to increase the degree of freedom of the arrangement, it is required to provide a plurality of routing circuits for the switches (extensions) extending from the bus bar and provide the contacts (additional electrodes) formed at those extension ends in the back substrate while it is required to provide a larger resistance film in the front substrate to secure the areas facing the contacts for the switches.

More particularly, like the former prior art arrangement, the latter prior art arrangement also requires that a larger area be secured in the peripheries of the resistance film for allowing the additional routing circuits for switches to be formed in the peripheries of the resistance film and the complicated circuitry be funned in order to increase the degree of freedom of the switch arrangement. Thus, when the latter prior art arrangement is applied to the protection panel, the protection panel becomes larger or the circuitry becomes complicated.

Further, in the latter prior art arrangement, whether the switch is operated is determined based on the volume of voltage outputted from the electrodes connected to each bus bar (first bus bar) in the front substrate by applying voltage between the electrodes connected to each bus bar (second bus bar) in the back substrate while the position of the switch operated is determined based on the volume of the voltage outputted from the electrodes connected to each bus bar in the back substrate by applying voltage between the electrodes connected to each bus bar in the front substrate.

To be more specific, in the latter prior art arrangement, the X-Y coordinate of the switch operated by applying voltage between the electrodes corresponding to the X-axis direction of the resistance film and between the electrodes corresponding to the Y-axis direction of the resistance film alternately, as a result of which the detecting speed of the switch operation is decreased compared with the former prior art arrangement in which the X-Y coordinate of the switch operated is determined by applying voltage between the electrodes corresponding to the X-axis direction of the resistance film.

The object of the invention is to provide switches in a protection panel having a touch input function of the analog resistance film method without making the panel larger by forming any additional routing circuit for switch.

A first characteristic feature of the present invention to achieve the above-noted object lies in a protection panel having a touch input function of the analog resistance film method, comprising:

a back substrate having a front surface provided with a resistance film, a pair of bus bars arranged in opposed sides of the resistance film, a pair of routing circuits each connected to each of the bus bars at one end thereof, and a pair of electrodes each connected to the other end of each of the routine circuits; and a front substrate having a back surface provided with a resistance film, a pair of bus bars arranged in opposed sides of the resistance film, a pair of routing circuits each connected to each of the bus bars at one end thereof, and a pair of electrodes each connected to the other end of each of the routine circuits, and a front surface provided with decoration in peripheries thereof, the back substrate and the front substrate being connected to each other to allow the resistance films to face each other at a predetermined distance and to allow either one of the pairs of bus bars to be arranged on opposed sides of the resistance film in an X-axis direction while the other of the pairs of bus bars to be arranged on opposed sides of the resistance film in a Y-axis direction, thereby to form a touch input section for detecting an X-Y coordinate representing an operated position by a potential gradient based on a touch operation relative to the front substrate;

wherein the back substrate and the front substrate include contacts, respectively, connected to each other in series on the resistance films through the routing circuits to have potential difference, wherein the contacts face each other at a predetermined distance when the back substrate and the front substrate are connected to each other, and wherein a switch is provided for detecting, when voltage is applied by the contacts between the electrodes of either one of the front substrate and the back substrate, whether or not the contacts are brought into contact with each other based on voltage detected by the electrodes of the other of the front substrate and the back substrate.

With such a characteristic feature, in order to provide the switch, it is only required to form the contact for touch input in the route of the routing circuit formed in the peripheries of the resistance film to extend from the bus bar to the electrode.

Thus, there is no need to provide any additional routing circuit for the switch in the peripheries of the resistance film. As a result, a large-sized protection panel or a complicated circuitry resulting from providing the additional routing circuit for the switch in the peripheries of the resistance film can be avoided.

It should be noted, in the protection panel in accordance with the present invention, the decoration provided in the rim portion of the front surface of the front substrate serves for covering the bus bars and the routing circuits formed in the peripheries of the resistance film. More particularly, providing decoration in the rim portion of the front surface of the front substrate dispenses with a bezel structure to be formed in the housing of the electronic device having the protection panel for covering the bus bars and the routing circuits formed in the peripheries of the resistance film.

According to the characteristic feature noted above, since the contact is formed in the route of the routing circuit, the switch can be provided by taking advantage of the rim portion of the front surface of the front substrate provided with the decoration for covering the routing circuits. As a result, a large-sized protection panel resulting from providing the switch in the protection panel can be avoided, and a degree of freedom for selecting a pattern for the switch can be increased.

Further, the switch arrangement is easily changed by varying the route of the routing circuit extending from the bus bar to the electrode.

Moreover, this characteristic feature makes it possible to determine whether or not the switch is operated and determine the position of the operated switch based on the volume of the voltage outputted from the electrodes of the front substrate by applying voltage between the electrodes of the back substrate. Further, it is also possible to determine whether or not the switch is operated and determine the position of the operated switch based on the volume of the voltage outputted from the electrodes of the back substrate by applying voltage between the electrodes of the front substrate. This increases the speed of detecting the switch operation.

As a result, the switch is provided in the protection panel having a touch input function of the analog resistance film method without making the protection panel larger or making the circuitry complicated by providing any additional routing circuit for the switch. Further, the degree of freedom for the switch arrangement in the protection panel and the speed for detecting the switch operation can be increased.

A second characteristic feature of the present invention lies in that the switch is formed as a variable type by employing resistance films as the contacts in the structure having the first characteristic feature noted above.

With this characteristic feature, when this protection panel is provided in the electronic device such as the digital camera having the photographing function, the variable switch can be used as a zoom switch for varying a focal distance based on the volume of voltage shifting depending on the touch-operated position of the switch or a shifting direction of voltage shifting depending on a slide-touch operation of the switch. When the protection panel is provided in the electronic device such as the digital audio player having the music playback function, the variable switch can be used as a volume switch for varying sound volume based on the volume of voltage shifting depending on the touch-operated position of the switch or a shifting direction of voltage shifting depending on a slide-touch operation of the switch.

Thus, it is possible to provide the switch suitable for the function of the electronic device having the protection panel of the present invention, which enhances the operability of the electronic device.

BRIEF DESCRIPTION OF THE DRAWINGS

FIG. 5 includes a front view of the back substrate and a rear view of the front substrate in the first embodiment;

BEST MODE FOR CARRYING OUT THE INVENTION

First Embodiment

By way of example of the best mode for carrying out the present invention, a first embodiment of a protection panel A having a touch input function of the analog resistance film method in accordance with the present invention as applied to a mobile phone 1 which is an example of an electronic device B will be described hereinafter in reference to the accompanying drawings.

The electronic device B, apart from the mobile phone 1, typically includes a smartphone, a PDA, a digital audio player, a car navigation equipment, a digital camera, a digital video camera, a portable gaming device and a tablet.

Figure 1:
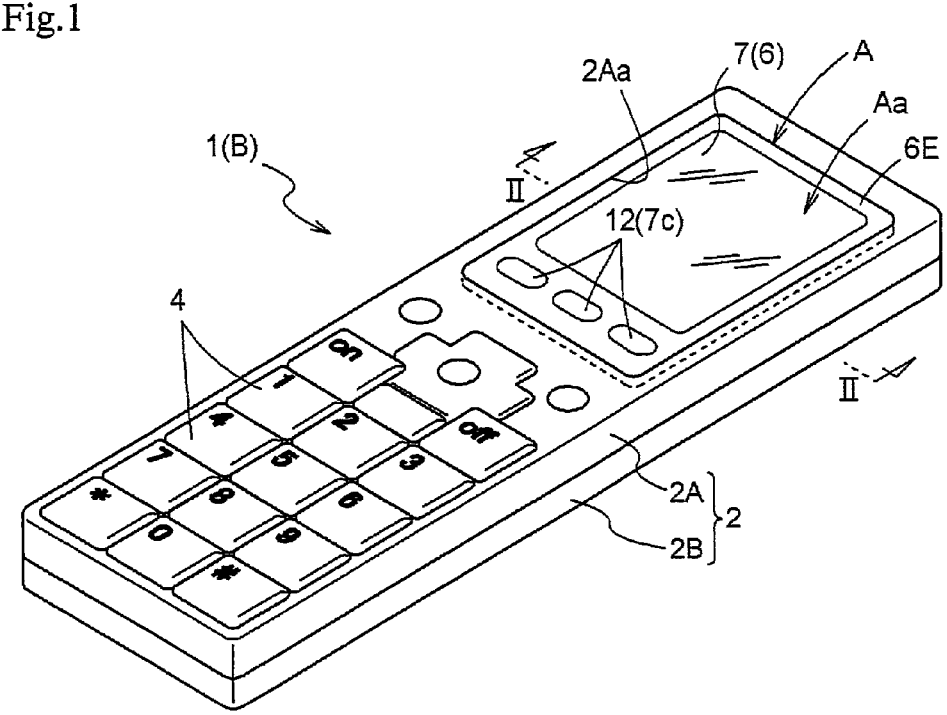
FIG. 1 is a perspective view of a mobile phone in a first embodiment.
Figure 2:
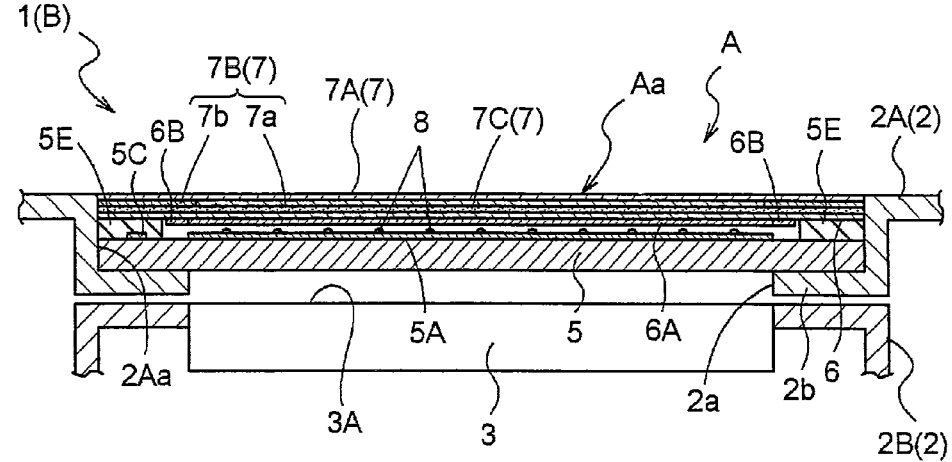
FIG. 2 is a bottom view in cross-section of a primary portion showing a construction of a protection panel.

FIG. 1 is an overall perspective view of the mobile phone 1. FIG. 2 is a bottom view in cross-section of a primary portion of the mobile phone 1. As shown in the drawings, the mobile phone 1 includes a housing 2 made of synthetic resin, a display device 3 having a display part 3A made of liquid crystal or organic EL, and a plurality of input keys 4, for example. The housing 2 includes a front housing part 2A having a display window 2Aa formed in a front face thereof, for example, and a rear housing part 2B provided with a display device 3. The protection panel A is provided in the display window 2Aa of the front housing part 2A so as to protect the display part 3A of the display device 3.

The display window 2Aa is formed as a dent so as to produce a difference in level to allow the protection panel A to fit into the dent. The display window 2Aa has a bottom having an opening 2a for exposing the display part 3A of the display device 3, and a support frame 2b for supporting the protection panel A.

The shape and size of the display window 2Aa may vary depending on the shape and size of the protection panel A. The depth of the dent for the display window 2Aa may vary depending on the thickness of the protection panel A. The shape and size of the opening 2a in the display window 2Aa may also vary depending on the shape and size of the display part 3A. In this embodiment, the shapes of the display window 2Aa, the opening 2a, the display part 3A and the protection panel A are rectangular or substantially rectangular. The depth of the dent for the display window 2Aa is selected so that the surface of the housing 2 is at the same level as the surface of the protection panel A.

The function provided by the analog resistance film method in the protection panel A means a function of detecting an X-Y coordinate representing an operated position by a potential gradient based on a touch operation relative to the surface of the protection panel A.

As shown in FIGS. 2 to 5, the protection panel A includes a back substrate 5 having a rectangular resistance film 5A formed on a front surface thereof, and a front substrate 6 having a rectangular resistance film 6A formed on a back surface thereof. The back substrate 5 and the front substrate 6 are arranged to face each other at a predetermined distance to have an air layer therebetween. An area in the protection panel A where the resistance films 5A and 6A are face each other functions as a touch input section Aa.

As shown in FIGS. 2 to 4 and FIG. 5(a), the back substrate 5 employs a resin plate that is superior in transparency, rigidity and workability such as polycarbonate resin (PC), methacryl resin (PMMA), acrylonitrile-styrene copolymer resin (AS), acrylonitrile-butadiene-styrene copolymer resin (ABS), cellulose-propionate resin (CP), polystyrene resin (PS), polyester rein, or polyethylene resin (PE), for example. It is preferable to use, in particular, polycarbonate resin (PC), or methacryl resin (PMMA) that has good transparency. The thickness of the resin plate may be selected from a range of 0.5 mm to 3.0 mm, and is most preferably 1.0 mm, in particular.

The back substrate 5 may employ a glass plate that is superior in strength and permeability such as soda glass, borosilicate glass and toughened glass. Using the glass plate having sufficient strength allows slimming-down of the protection panel A by reducing the thickness of the back substrate 5, and allows in turn slimming-down of the mobile phone 1 provided with the protection panel A. The thickness of the glass plate may be selected from a range of 0.2 mm to 3.0 mm, and is most preferably 1.0 mm, in particular.

The back substrate 5 includes four conducting through holes 5a and 5b formed at a lower left edge of a rim portion thereof and extending from the front surface through the back surface of the back substrate 5 to align linearly at regular intervals in a lateral direction. The back substrate 5 includes at the front surface thereof, in addition to the resistance film 5A, a pair of parallel bus bars 5B provided in opposed sides in the Y-axis direction, a pair of routing circuits 5C provided in peripheries of the resistance film 5A, a pair of electrodes 5D provided in portions where the associated through holes 5a are formed, and a frame-like adhesion layer 5E.

The back substrate 5 may be formed to have the resistance film 5A, the pair of bus bars 5B, the pair of routing circuits 5C, the pair of electrodes 5D and the frame-like adhesion layer 5E at the front surface thereof by affixing a back surface of a transparent insulation film on the front surface of the back substrate 5, the transparent insulation film having the resistance film 5A, the pair of bus bars 5B, the pair of routing circuits 5C, the pair of electrodes 5D and the frame-like adhesion layer 5E formed on a front surface thereof.

Where the transparent insulation film is used, a resin film made of engineering plastic of a polycarbonate type, a polyamide type and a polyetherketone type, or an acryl type, a polyethylene-terephthalate type and a polybutylene-terephthalate type may be used.

As shown in FIGS. 2 to 4 and FIG. 5(b), the font substrate 6 employs a flexible transparent insulation film having a nature of bending when pressed by a finger, for example. As the flexible transparent insulation film, a resin film made of engineering plastic of a polycarbonate type, a polyamide type and a polyetherketone type, or an acryl type, a polyethylene-terephthalate type and a polybutylene-terephthalate type may be used.

The front substrate 6 includes at the back surface thereof, in addition to the resistance film 6A, a pair of parallel bus bars 6B provided in opposed sides in the X-axis direction, a pair of routing circuits 6C provided in the peripheries of the resistance film 6A, and a pair of electrodes 6D provided to face the associated through holes 5b. A design sheet 7 is affixed to the front surface of the front substrate 6.

As shown in FIGS. 2 to 5, each of the resistance films 5A and 6A comprises a transparent conductive membrane including a metal oxide film made of tin oxide, indium oxide, antimony oxide, zinc oxide, cadmium oxide, or indium tin oxide (ITO), a composite membrane having such a metal oxide as a principal component, or a metal membrane made of gold, silver, copper, tin, nickel, aluminum, or palladium. It should be noted that each of the resistance films 5A and 6A may have a multiple-layer construction including two or more layers. Each of the resistance films 5A and 6A may be formed using the vacuum deposition method, the sputtering method, the ion plating method, or the CVD method.

A plurality of dot-like fine spacers 8 may be formed on the surface of either one of the resistance films 5A and 6A for preventing erroneous contact between the resistance films 5A and 6A when they face each other. In the present embodiment, the plurality of spacers 8 is formed on the resistance film 5A of the back substrate 5.

The spacers 8 may employ transparent light-curing resin such as an epoxy-acrylate type or a urethane-acrylate type, or transparent thermosetting resin such as a polyester type or an epoxy type. Further, the spacers 8 may be formed using the printing method such as screen printing or the photoprocess.

Each of the bus bars 5B and 6B, each of the routing circuits 5C and 6C, and each of the electrodes 5D and 6D may be formed using metal such as gold, silver, copper and nickel, or conductive paste such as carbon. Each of the bus bars 5B and 6B, each of the routing circuits 5C and 6C, and each of the electrodes 5D and 6D may be formed using the screen method such as screen printing, offset printing, gravure printing and flexographic printing, the photoresist method, or the brush painting method.

Generally, each pair of the bus bars 5B and 6B is formed as close to the edge portion of the back substrate 5 or the front substrate 6 as possible to secure as wide an area as possible in the central portion of the back substrate 5 or the front substrate 6 where the bus bars 5B or 6B are absent. The size or the shape of the area where the bus bars 5B or 6B are absent, that is, the shape of an input area or a display area may be variously modified depending on the size or the shape of an input area or a display area of the electronic device B such as the mobile phone 1.

As shown in FIGS. 1 to 4, the design sheet 7 may be made of engineering plastic such as a polycarbonate type, a polyamide type and a polyetherketone type, or a transparent film made of an acrylic type, a polyethylene-terephthalate type, or a polybutylene-terephthalate type. The thickness of the transparent film may be selected from a range from 25 μm to 200 μm.

The design sheet 7 has a front surface having a hard coating layer 7A formed thereon and a back surface having a decorative layer 7B and an adhesion layer 7C formed thereon.

As a material used for the hard coating layer 7A, there are an inorganic material such as siloxane-type resin, or an organic material such as thermosetting resin made of an acrylic-epoxy type or a urethane-type or light curing resin made of an acrylate type. The proper thickness of the hard coating layer is approximately 1 μm to 7 μm. The hard coating layer 7A may be formed using the coating method such as roll coating and spray coating or the regular printing method such as screen printing, offset printing, gravure printing or flexographic printing.

The hard coating layer 7A may be formed directly on the front surface of the transparent sheet having the decorative layer 7 and the adhesion layer 7C formed on the back surface thereof. Alternatively, the hard coating layer 7A may be formed on another transparent sheet different from the design sheet 7 having the decorative layer 7B and the adhesion layer 7C directly formed on the back surface thereof, and then those two transparent sheets may be affixed together.

Nonglare treatment may be applied to the design sheet 7 for preventing light reflection by making the transparent sheet or the hard coating layer 7A uneven, or mixing fine particles of silica or alumina that is extender pigment with the hard coating layer 7A, for example.

The decorative layer 7B is formed to have a rectangular transparent portion 7a at the center thereof, and a frame-like decorative portion 7b at the perimeter thereof. The size or the shape of the transparent portion 7a may be variously modified depending on the size or the shape of the input area or the display area where the bus bars 5B and 6B and the routing circuits 5C and 6C are absent in the back substrate 5 or the front substrate 6, that is, the size or the shape of the input area or the display area of the electronic device B such as the mobile phone 1.

The decorative layer 7B is formed in this manner to decorate the rim portion 6E of the front substrate 6 for covering and concealing the bus bars 5B and 6B and the like of the back substrate 5 and the front substrate 6. This dispenses with a frame-like portion in the display window 2A of the housing 2 for covering and concealing the bus bars 5B and 6B and the like of the back substrate 5 and the front substrate 6, by which the thickness of the mobile phone 1 can be reduced.

The decorative layer 7B may use polyvinyl-type resin, polyamid-type resin, polyester-type resin, poly-acrylic-type resin, polyurethane-type resin, polyvinyl-acetal-type resin, polyester-urethan-type resin or alkyd resin as a binder, and coloring ink containing a pigment or a dye of a desired color as a coloring agent.

The decorative layer 7B may be formed using the regular printing method such as screen printing, offset printing, gravure printing, or flexographic printing. In particular, offset printing or gravure printing is suitable for multicolored printing and gradation representation.

The decorative layer 7B may be made of a metal thin layer or a combination of a pattern-printed layer and the metal thin layer. The metal thin layer provides a metallic luster as the decorative layer 7B and is foamed using the vacuum deposition method, the sputtering method, the ion plating method or the plating method. In this case, the metal such as aluminum, nickel, gold, platinum, chromium-iron alloy, copper, tin, indium, silver, titanium, lead and zinc, or alloys or compounds thereof may be used depending on a desired metallic luster. The thickness of the metal thin layer is generally about 0.05 μm. Further, a front anchor layer or a rear anchor layer may be formed in providing the metal thin layer in order to enhance its bonding property relative to other layers.

As the adhesion layer 7C, heat-sensitive or pressure-sensitive resin suitable for the front substrate 6 and the design sheet 7 is used appropriately. Where the front substrate 6 and the design sheet 7 are made of a polycarbonate type or a polyamide type, for example, polyacrylic-type resin, polystyrene-type resin, polyamide-type resin and the like may be used. On the other hand, where the front substrate 6 and the design sheet 7 are made of an acrylic type or a polyethylene-terephthalate type, vinyl chloride, vinyl acetate or acrylic-type copolymer may be used.

The adhesion layer 7C may be formed using the regular printing method such as screen printing, offset printing, gravure printing, and flexographic printing.

The front substrate 6 may dispense with the design sheet 7. Where the design sheet 7 is not provided, the hard coating layer 7A may be formed on the front surface of the front substrate 6. When nonglare treatment is applied in the case where the design sheet 7 is not provided, there are ways in which the front surface of the front substrate 6 or the hard coating layer 7A is made uneven, or fine particles of silica or alumina that is extender pigment are mixed with the hard coating layer 7A, for example.

Figure 3:
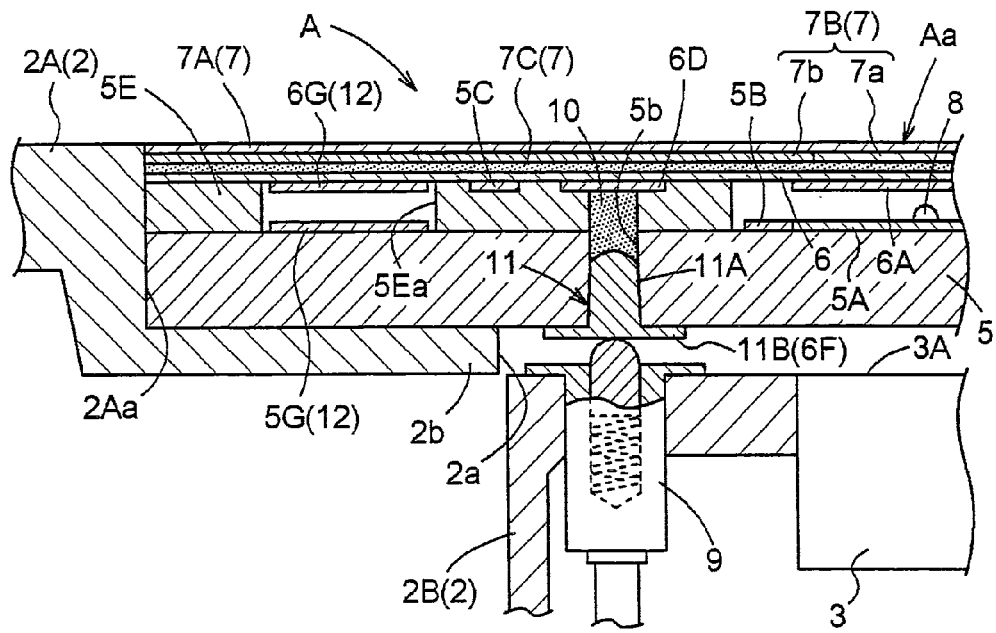
FIG. 3 is a side view in vertical-section of a primary portion showing a switch construction and a conducting arrangement of a front substrate.
Figure 4:
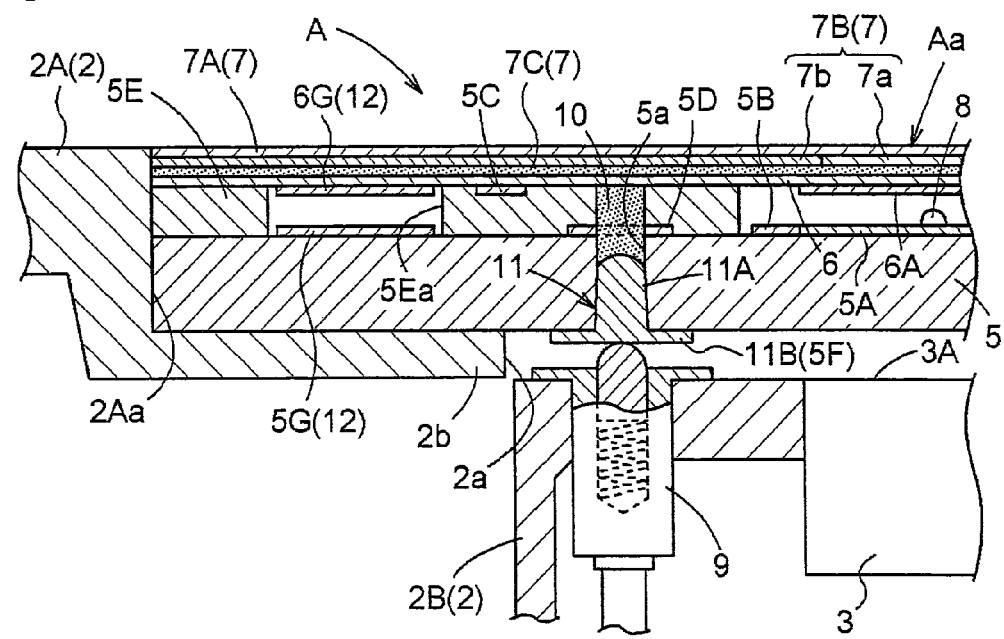
FIG. 4 is a side view in vertical-section of a primary portion showing a switch construction and a conducting arrangement of a back substrate.

As shown in FIGS. 3 and 4, the rear housing part 2B includes four spring connector pins 9 provided to face the through holes 5a and 5b of the back substrate 5, respectively. Each spring connector pin 9 is conductively connected to an interface of the display device 3 (not shown).

The electrodes 5D and 6D of the back substrate 5 and the front substrate 6 are conductively connected to the corresponding spring connector pins 9, respectively, using the through holes 5a and 5b of the back substrate 5.

A conductive adhesive 10 comprising conductive paste is injected into the through holes 5a and 5b to be conductively brought into contact with the corresponding electrodes 5D and 6D while headed conductive pins 11 are inserted to allow one end 11A of each of the pins to be conductively brought into contact with the conductive adhesive 10.

Each of the conductive pins 11 has a circular flat head portion 11B formed at the other end 11B thereof. The head portion 11B is exposed at the back side of the front housing part 2A after inserted into the corresponding through bore 5a or 5b. This allows touch input signals received from the respective resistance films 5A and 6A to be fetched out to the back side of the front housing part 2A. When the front housing part 2A and the rear front housing part 2B are joined together, the head portions 11B of the conductive pins 11 act as flat terminals 5F and 6F for connecting the electrode 5D of the back substrate 5 and the electrode 6D of the front substrate 6 to the corresponding spring connector pins 9. As a result, the touch input signals received from the resistance films 5A and 6A are inputted to the display device 3.

Each of the through holes 5a and 5b preferably has a diameter of 0.1 mm to 1.0 mm. There is a possibility that each of the through holes 5a may not be securely conductive if the diameter of the through hole 5a is less than 0.1 mm while there is a possibility that the conductive adhesive 10 may not be injected into the through holes 5a and 5b satisfactorily if the diameter of the through hole 5a exceeds 1.0 mm. In addition, the amount of the conductive adhesive 10 to be used is uneconomically increased.

As the conductive paste used for the conductive adhesive 10, silver paste and copper paste may be used. The conductive adhesive 10 may be injected by application using a dispenser or screen printing. Further, in addition to injection of the conductive adhesive 10, a layer provided with non-electrolytic plating such as nickel or electrolytic plating may be formed on inner walls of the through holes 5a and 5b.

The head portion 11B of each of the conductive pins 11 has a thickness of 20 μm to 200 μm. Each of the conductive pins 11 may be of a female type having a recess instead of the head portion 11B or a male type having a projection instead of the head portion 11B. As the conductive pins 11, a metal pin made of copper, iron, nickel, aluminum or stainless steel, for example, may be used. It is preferable that the conductive pins 11 are plated with gold at least at opposite ends thereof that are brought into contact with the conductive adhesive 10 and the spring connector pins 9.

Instead of the conductive pins 11, a flexible print circuit comprising a film having a circuit made of copper foil formed on one surface of a polyimide film may be employed.

Figure 5:
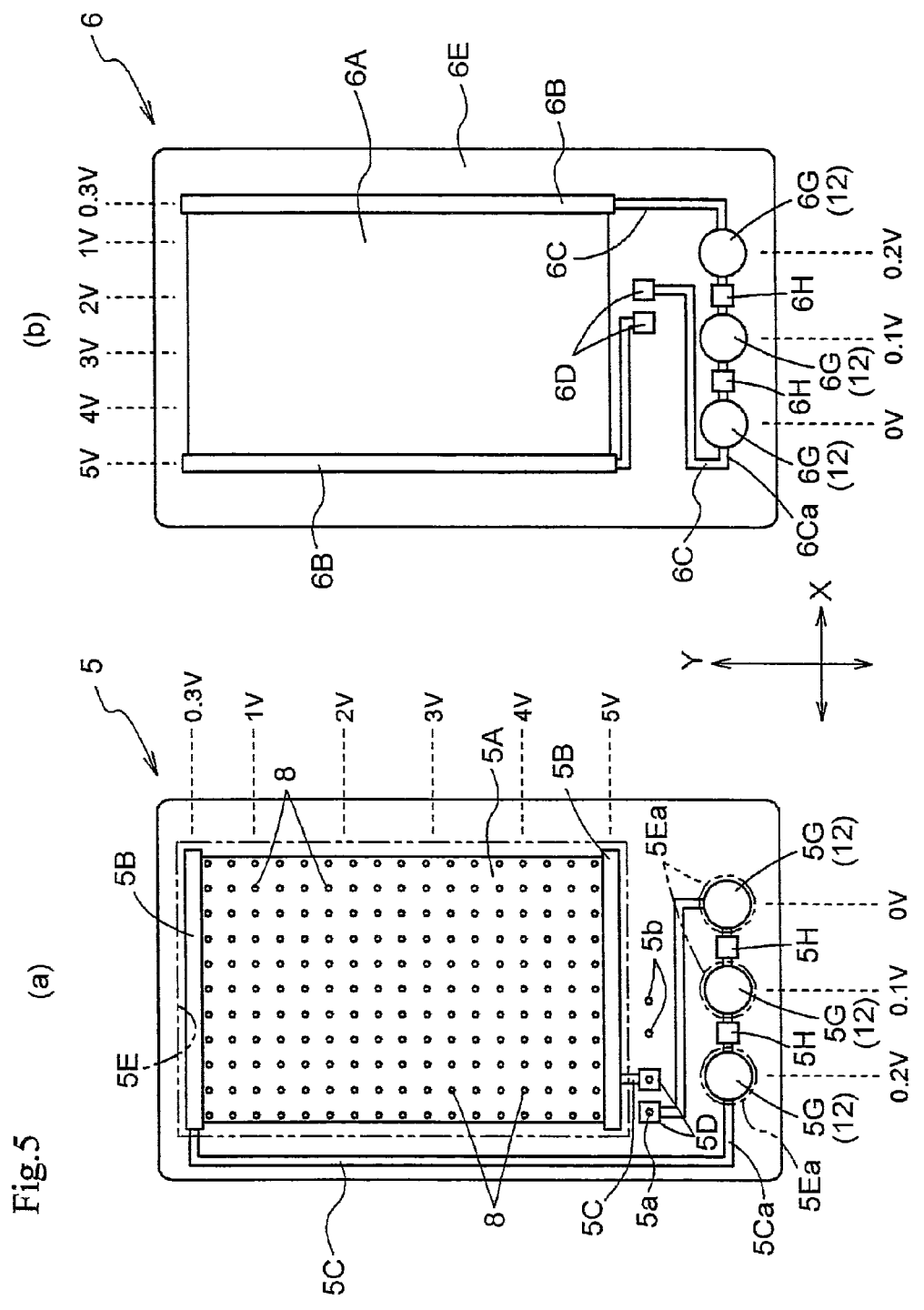

As shown in FIG. 5, the pair of routing circuits 5C or 6C of the back substrate 5 or the front substrate 6 allows one of the pair of routing circuits 5C or 6C to pass the shortest route from the bus bars 5B or 6B through the electrodes 5D or 6D. The other of the pair of routing circuits 5C or 6C is formed to have a circuit portion 5Ca or 6Ca extending along a lower edge of the back substrate 5 or the front substrate 6. In each of the circuit portions 5Ca and 6Ca, three contacts 5G or 6G and two resistive elements 5H or 6H are arranged to be spaced from each other at regular intervals so that the resistive elements 5H or 6H are positioned between the adjacent contacts 5G or 6G.

More particularly, the back substrate 5 and the front substrate 6 are provided with the three contacts 5G and 6G respectively, that are connected in series through the corresponding routing circuits 5C and 6C so that their resistance films 5A and 6A have difference in potential.

The contacts 5G and 6G are arranged so that the corresponding contacts 5G and 6G face each other to be spaced from each other by a predetermined distance when the back substrate 5 is connected to the front substrate 6. The adhesion layer 5E of the back substrate 5 has openings 5Ea for allowing the opposed contacts 5G and 6G to come into contact with each other.

More particularly, the opposed contacts 5G and 6G form a switch 12 for detecting whether or not those contacts are placed in contact with each other based on voltage detected by one pair of the electrodes 5D (or 6D) of the back substrate 5 or the front substrate 6 when voltage is applied between the other pair of the electrodes 6D (or 5D).

Such an arrangement of the switch 12 dispenses with any additional routing circuit for the exclusive use of the switch 12 to be provided in the perimeters of the resistance films 5A and 6A of the back substrate 5 and the front substrate 6, which can avoid a large-sized protection panel A or a complicated circuitry resulting from providing the additional routing circuit for the exclusive use of the switch in the perimeters of the resistance films 5A and 6A of the back substrate 5 and the front substrate 6.

In addition, since the contacts 5G and 6G are provided on the routs of the routing circuits 5C and 6C, the arrangement of the switch 12 may be freely changed by altering the routs of the routing circuits 5C and 6C.

Moreover, the switch 12 can be provided making efficient use of the rim portion 6E of the front substrate 6 decorated with the decorative portion 7b of the decorative layer 7B to cover and conceal the routing circuits 5C and 6C. As a result, it is possible to prevent enlargement of the protection panel A that would be caused by providing the switch 12 in the protection panel A and to increase a degree of freedom for selecting a pattern of the switch 12.

With the protection panel A having such a switch 12, the Y-coordinate of the touched switch 12, if either one of the switches is touchi-operated by the user, is determined based on the value of the voltage outputted from the electrodes 6D of the front substrate 6 when voltage is applied between the electrodes 5D of the back substrate 5. This specifies which switch 12 has been touch-operated by the user. Further, when the touch input section Aa is touch-operated where the resistance films 5A and 6A face each other, the Y-coordinate of the touch-operated position in the touch input section Aa is determined based on the value of the voltage outputted from the electrodes 6D of the front substrate 6.

Next, when voltage is applied between the electrodes 6D of the front substrate 6, the X-coordinate of the touched switch 12, if either one of the switches is touch-operated by the user, is determined based on the value of the voltage outputted from the electrodes 5D of the back substrate 5 when voltage is applied between the electrodes 6D of the front substrate 6. This also specifies which switch 12 has been touch-operated by the user. Further, when the touch input section Aa is touch-operated, the X-coordinate of the touch-operated position in the touch input section Aa is determined based on the value of the voltage outputted from the electrodes 5D of the back substrate 5.

More particularly, when either one of the switches 12 is touch-operated, the touched switch 12 can be specified with voltage being applied between the electrodes 5D or 6D, whether between the electrodes 5D of the back substrate 5 or between the electrodes 6D of the front substrate 6. Further, when the touch input section Aa is touch-operated, the touch-operated position in the touch input section Aa can be specified based on the Y-coordinate of the touch-operated position determined by applying voltage between the electrodes 5D of the back substrate 5 and the X-coordinate of the touch-operated position determined by applying voltage between the electrodes 6D of the front substrate 6.

The contacts 5G and 6G may be formed using the conductive paste comprising metal such as gold, silver, copper and nickel, or carbon. The contacts 5G and 6G may be formed using the printing method including screen printing, offset printing, gravure printing and flexographic printing, the photoresist method, the brush painting method, for example.

The resistive elements 5H and 6H may be formed using a metal oxide film made of tin oxide, indium oxide, antimony oxide, zinc oxide, cadmium oxide, or indium tin oxide (ITO), a composite membrane having such a metal oxide as a principal component, or a metal membrane made of gold, silver, copper, tin, nickel, aluminum, or palladium. Each of the resistive elements 5H and 6H may be formed using the vacuum deposition method, the sputtering method, the ion plating method, or the CVD method.

As shown in FIG. 1, the design sheet 7 has a pattern 7c for indicating the switch 12 formed on the decorative portion 7b of the decorative layer 7B at the position corresponding to the each of the contacts 6G of the front substrate 6.

The structure of the protection panel A having the touch input function of analog the resistance film method will be described in detail hereinafter in reference to FIGS. 2 to 5.

First, a flexible transparent insulation film made of a polyethylene terephthalate film (referred to as a PET film hereinafter) in the form of a roll having a thickness of 75 μm is provided with ultraviolet curable acrylic hard-coating applied on one surface thereof using a roll coater, whereby a PET film having one surface thereof provided with the hard coating is obtained. Then, an indium tin oxide film (referred to as an ITO film hereinafter) is formed on the hard-coating surface by sputtering.

Next, the PET film is cut into a sheet having predetermined vertical and horizontal lengths. An etching resist is applied on the ITO film in the form of pattern by screen printing and then an unwanted portion of the ITO film is removed using sulfuric acid to form the rectangular resistance film 6A and the two resistive elements 6H. The two resistive elements 6H are laterally arranged at a predetermined distance at the lower edge portion of the PET film.

After the etching treatment, the resist is removed by alkali cleaning, and the pair of parallel bus bars 6B, the pair of routing circuit 6C, the pair of electrodes 6D and the three contacts 6G are formed by screen printing using silver paste in the opposed sides in the X-axis direction of the resistance film 6A and in the perimeter of the resistance film 6A. The three contacts 6G are laterally arranged at regular intervals at the lower edge portion of the PET film. The resistive element 6H are arranged between the adjacent contacts 6G. One of the pair of routing circuits 6C is allowed to pass the shortest route from the bus bars 6B through the electrodes 6D while the other of the pair of routing circuits 6C is foamed to have a circuit portion 6Ca extending along the lower edge of the PET film. The two resistive elements 6H and the three contacts 6G are interconnected in series in the order of lateral arrangement through the circuit portion 6Ca. The pair of electrodes 6D are laterally arranged at a predetermined distance between the bus bars 6B and the circuit portion 6Ca below the left lower edge portion of the PET film.

As a result, the front substrate 6 is obtained having the back side provided with the resistance film 6A, the pair of bus bars 6B, the pair of routing circuit 6C, the pair of electrodes 6D, the three contacts 6G and the two resistive elements 6H (see FIG. 5(b)).

Next, a transparent film made of a PET film in the form of a roll having a thickness of 125 μm is provided with ultraviolet curable acrylic hard-coating on both surfaces thereof using a roll coater, whereby a PET film having both the surfaces thereof provided with the hard coating is obtained.

Then, the PET film is cut into a sheet having the same vertical and horizontal lengths as those of the front substrate 6. On one of the surfaces of the film are formed by gravure printing the decorative layer 7B having the rectangular transparent portion 7a at the central portion thereof and the frame-like decorative portion 7b at the peripheries thereof, and the adhesion layer 7C made of a transparent adhesive containing acrylic acid ester as a principal component.

In this, the pattern 7c indicating the switch 12 is formed on the position corresponding to each contact 6G of the front substrate 6 in the decorative portion 7b.

As a result, the design sheet 7 is obtained having the front surface provided with the hard coating layer 7A and the back surface provided with the decorative layer 7B and the adhesion layer 7C.

The obtained front substrate 6 and the design sheet 7 are affixed together over the entire surfaces thereof so that the surface of the front substrate 6 in which the ITO film is not formed (front surface) faces the surface of the design sheet 7 in which the decorative layer is formed (back surface) across the adhesion layer 7C and the position where each of the contacts 6G of the front substrate 6 is formed corresponds to the position where the pattern 7c of the design sheet 7 is formed.

As a result, the front substrate 6 is obtained having the pattern 7c for the switch in the rim portion 6E thereof.

On the other hand, an ITO film is formed by sputtering on one surface of a polycarbonate plate having a thickness of 1.0 mm and the same vertical and horizontal lengths as those of the front substrate 6. Then, an etching resist is applied on the ITO film in the form of pattern by screen printing and then an unwanted portion of the ITO film is removed using sulfuric acid to form the rectangular resistance film 5A and the two resistive elements 5H. The two resistive elements 5H are laterally arranged at a predetermined distance at the lower edge portion of the polycarbonate plate.

Next, the plurality of the fine dot-like spacers 8 are formed on the entire surface of the resistance film 5A by screen printing using thermosetting resin of an epoxy-acrylate type. Further, the pair of parallel bus bars 5B, the pair of routing circuit 5C, the pair of electrodes 5D and the three contacts 5G are formed by screen printing using silver paste in the opposed sides in the Y-axis direction of the resistance film 5A and in the perimeter of the resistance film 5A. The three contacts 5G are laterally arranged at regular intervals at the lower edge portion of the polycarbonate plate so as to allow the resistive element 5H to be arranged between the adjacent contacts 5G and to face the corresponding contacts 6G of the front substrate 6. One of the pair of routing circuits 5C is allowed to pass the shortest route while the other of the pair of routing circuits 5C is formed to have a circuit portion 5Ca extending along the lower edge of the polycarbonate plate. The two resistive elements 5H and the three contacts 5G are interconnected in series in the order of lateral arrangement through the circuit portion 5Ca. The pair of electrodes 5D are laterally arranged at a predetermined distance between the lower bus bar 5B and the circuit portion 5Ca below the left lower edge portion of the polycarbonate plate, and at a leftward position spaced from the electrodes 6D of the front substrate 6 by a predetermined distance.

Then, adhesive ink containing acrylic acid ester as a principal component is applied on the rim portion of the polycarbonate plate by screen printing without covering the contacts 5G to form the frame-like adhesion layer 5E. The four through holes 5a and 5b are formed by drilling in the lower left edge portion of the rim portion to align linearly along the lower edge of the polycarbonate plate. Two of the through holes 5a are formed to receive the corresponding electrodes 5D while the remaining two through holes 5b are formed to face the corresponding electrodes 6D of the front substrate 6.

As a result, the back substrate 5 is obtained having the front side provided with the resistance film 5A, the pair of bus bars 5B, the pair of routing circuit 5C, the pair of electrodes 5D, the adhesion layer 5E, the three contacts 5G and the two resistive elements 5H (see FIG. 5(a)).

Then, the back substrate 5 is affixed to the front substrate 6 to which the design sheet 7 is affixed across the adhesion layer 5E of the back substrate 5 so that the resistance film 5A faces the resistance film 6A, the contact 5G faces the contact 6G across the air layer, the bus bars 5B are perpendicular to the bus bar 6B, and the electrodes 6D of the front substrate 6 close the front sides of the corresponding through holes 5b.

Next, silver paste serving as the conductive adhesive 10 is injected by a dispenser to the electrodes 5D and 6D of the through holes 5a and 5b.

After the injection, using ultrasonic melting of an ultrasonic press-in device, the headed conductive pin 11 is pressed into each of the through holes 5a and 5b so that the one end 11A thereof reaches the conductive adhesive 10, thereby to form the flat terminals 5F and 6F allowing the electrodes 5D of the back substrate 5 and the electrodes 6D of the front substrate 6 to be electrically conductive with the spring connector pins 9 provided in the rear housing part 2B to permit the touch input signals to be fetched out of the resistance films 5A and 6A and the contacts 5G and 6G.

As a result, the protection panel A having the touch input section Aa of the analog resistance film method and the three switches 12 is obtained (see FIGS. 1 to 4).

Second Embodiment

A second embodiment of the protection panel A having the touch input function of the analog resistance film method in accordance with the present invention as applied to the mobile phone 1 that is one example of the electronic device B will be described hereinafter in reference to the accompanying drawings.

Figure 6:
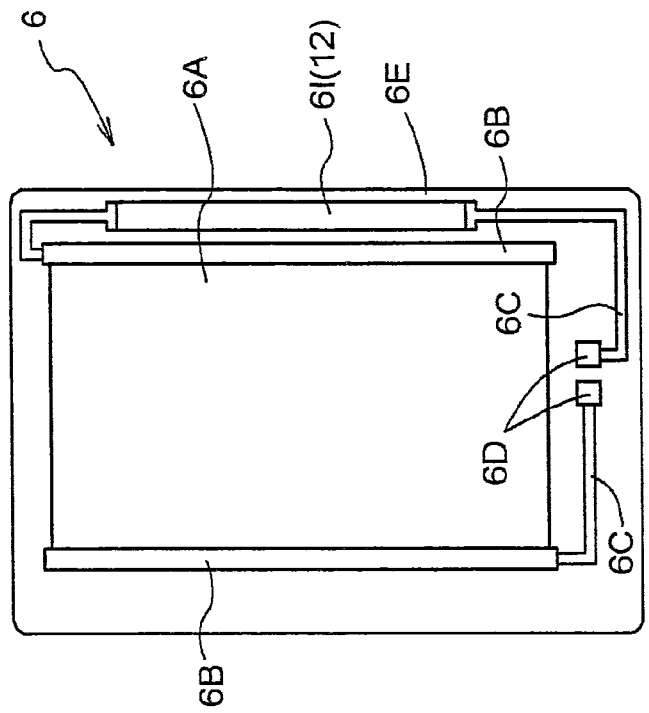
FIG. 6 includes a front view of the back substrate and a rear view of the front substrate in a second embodiment.
Figure 6:
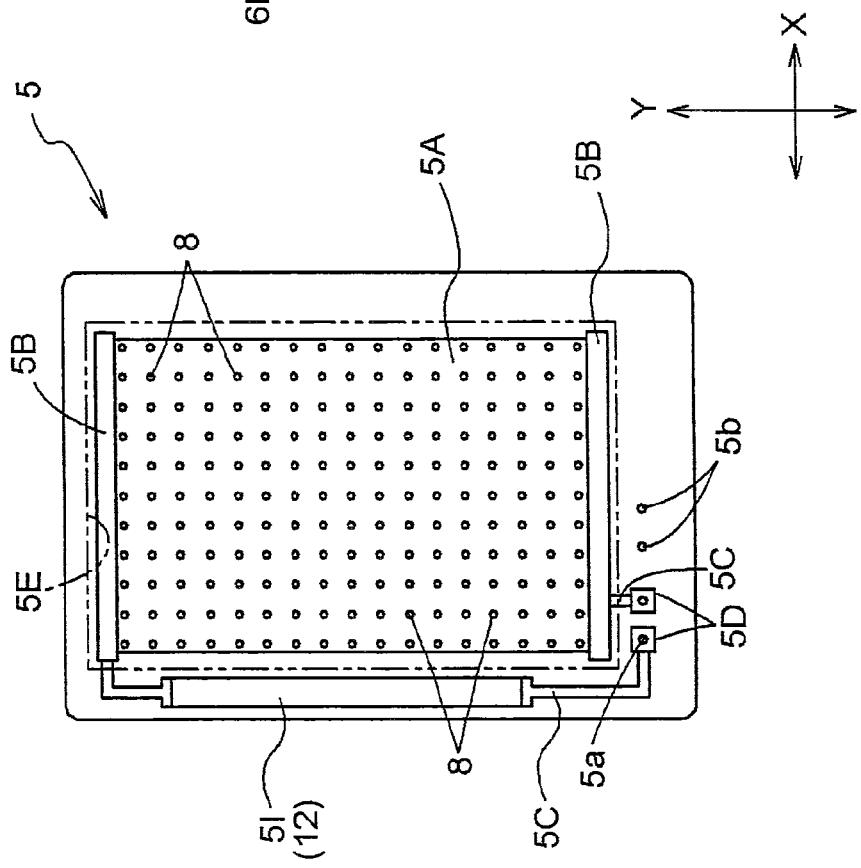

The second embodiment and the first embodiment are different from each other in the arrangement and the structure of the switch 12 while they are the same in the remaining components. Thus, only the arrangement and the structure of the switch 12 will be described in reference to FIGS. 6 and 7.

First, an etching resist is applied on the ITO film made of a PET film in the form of pattern by screen printing and then an unwanted portion of the ITO film is removed using sulfuric acid to form the rectangular resistance film 6A and a resistance film 6I extending vertically in straight line. The resistance film 6I is placed to be spaced apart from the left side of the rectangular resistance film 6A by a predetermined distance as viewed from the front of the PET film.

After the etching treatment, the resist is removed by alkali cleaning, and the pair of parallel bus bars 6B, the pair of routing circuit 6C, and the pair of electrodes 6D are formed by screen printing using silver paste in the opposed sides in the X-axis direction of the resistance film 6A and in the perimeter of the resistance film 6A. One of the pair of routing circuits 6C is allowed to pass the shortest route while the other of the pair of routing circuits 6C is formed to connect the resistance film 6I to the upper bus bar 6B at an upper edge thereof and to the corresponding electrode 6D at a lower edge thereof. The pair of electrodes 6D are laterally arranged in at a predetermined distance at the left lower edge portion of the PET film.

As a result, the front substrate 6 is obtained having the back side provided with the rectangular resistance film 6A, the pair of bus bars 6B, the pair of routing circuit 6C, the pair of electrodes 6D, and the linear resistance film 6I (see FIG. 6(b)).

Next, on one of the surfaces of the PET film provided with hard coating on both surfaces thereof are formed, by gravure printing, the decorative layer 7B having the rectangular transparent portion 7a at the central portion thereof and the frame-like decorative portion 7b at the peripheries thereof, and the adhesion layer 7C made of a transparent adhesive containing acrylic acid ester as a principal component.

In this, a pattern 7d indicating the switch 12 is formed on the position corresponding to the linear resistance film 6I of the front substrate 6 in the decorative portion 7b.

As a result, the design sheet 7 is obtained having the front surface provided with the hard coating layer 7A and the back surface provided with the decorative layer 7B and the adhesion layer 7C.

The obtained front substrate 6 and the design sheet 7 are affixed together over the entire surfaces thereof so that the surface of the front substrate 6 in which the ITO film is not formed (front surface) faces the surface of the design sheet 7 in which the decorative layer is formed (back surface) across the adhesion layer 7C and the position where each of the linear resistance film 6I of the front substrate 6 is formed corresponds to the position where the pattern 7d of the design sheet 7 is formed.

As a result, the front substrate 6 is obtained having the pattern 7d for the switch in the rim portion 6E thereof.

On the other hand, an ITO film is formed by sputtering on one surface of a polycarbonate plate having a thickness of 1.0 mm and the same vertical and horizontal lengths as those of the front substrate 6.

Then, an etching resist is applied on the ITO film in the form of pattern by screen printing and then an unwanted portion of the ITO film is removed using sulfuric acid to form the rectangular resistance film 5A and a resistance film 5I extending vertically in straight line on the left side of the rectangular resistance film. The resistance film 5I is arranged to face the resistance film 6I of the front substrate 6.

Next, the plurality of the fine dot-like spacers 8 are formed on the entire surfaces of the resistance films 5A and 5I by screen printing using thermosetting resin of an epoxy-acrylate type. Further, the pair of parallel bus bars 5B, the pair of routing circuits 5C, and the pair of electrodes 5D are formed by screen printing using silver paste in the opposed sides in the Y-axis direction and in the perimeter of the resistance film 5A. One of the pair of routing circuits 5C is allowed to pass the shortest route while the other of the pair of routing circuits 5C is formed to connect the resistance film 5I to the left bus bar 5B at an upper edge thereof and connect the resistance film 5I to the corresponding electrode 5D at a lower edge thereof. The pair of electrodes 5D are laterally arranged at a predetermined distance at the left lower edge portion of the PET film and located at the position spaced apart leftward from the electrodes 6D of the front substrate 6 by a predetermined distance.

Then, adhesive ink containing acrylic acid ester as a principal component is applied on the rim portion of the polycarbonate plate by screen printing without covering the resistance film 5I to form the frame-like adhesion layer 5E. The four through holes 5a and 5b are formed by drilling in the lower left edge portion of the rim portion to align linearly along the lower edge of the polycarbonate plate. Two of the through holes 5a are formed to receive the corresponding electrodes 5D while the remaining two through holes 5b are formed to face the corresponding electrodes 6D of the front substrate 6.

As a result, the back substrate 5 is obtained having the front side provided with the resistance film 5A, the pair of bus bars 5B, the pair of routing circuit 5C, the pair of electrodes 5D, the adhesion layer 5E, and the linear resistance film 5I (see FIG. 6(a)).

Then, the back substrate 5 is affixed to the front substrate 6 through the adhesion layer 5E of the back substrate 5 to which the design sheet 7 is affixed so that the rectangular resistance film 5A faces the resistance film 6A, the linear resistance film 5I faces the linear resistance film 6I across the air layer, the bus bars 5B are perpendicular to the bus bar 6B, and the electrodes 6D of the front substrate 6 close the front sides of the corresponding through holes 5b.

Next, silver paste serving as the conductive adhesive 10 is injected by a dispenser to the electrodes 5D and 6D of the through holes 5a and 5b.

After the injection, using ultrasonic melting of an ultrasonic press-in device, the headed conductive pin 11 is pressed into each of the through holes 5a and 5b so that the one end 11A thereof reaches the conductive adhesive 10, thereby to form the flat terminals 5F and 6F allowing the electrodes 5D of the back substrate 5 and the electrodes 6D of the front substrate 6 to be electrically conductive with the spring connector pins 9 provided in the rear housing part 2B to permit the touch input signals to be fetched out of the rectangular resistance films 5A and 6A and the linear resistance films 5I and 6I.

Figure 7:
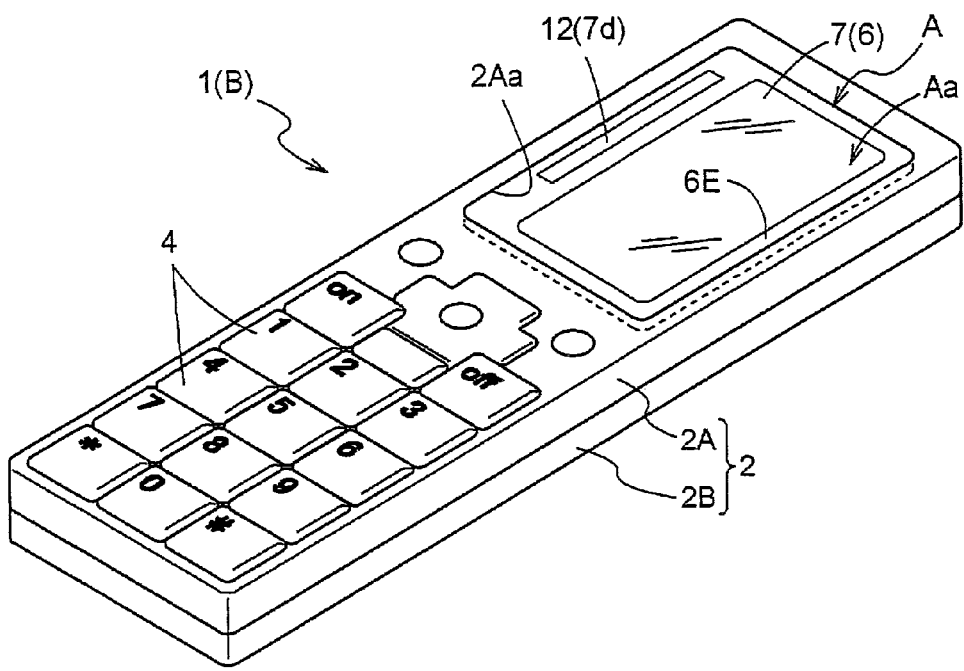
FIG. 7 is a perspective view of the mobile phone in the second embodiment.

As a result, the protection panel A having the touch input section Aa of the analog resistance film method and the variable switch 12 is obtained (see FIG. 7).

With the protection panel A having such a variable switch 12, when voltage is applied between the electrodes 5D of the back substrate 5 with the variable switch 12 being touch-operated, the touch-operated position relative to the switch 12 (Y-coordinate) or the operational direction on the Y-axis is determined based on the volume or the shifting direction of the voltage outputted from the electrodes 6D of the front substrate 6. When the touch input section Aa is touch-operated, the Y-coordinate of the touch-operated position in the touch input section Aa is determined based on the volume of the voltage outputted from the electrodes 6D of the front substrate 6.

Next, when voltage is applied between the electrodes 6D of the front substrate 6 with the variable switch 12 being touch-operated, the touch-operated position (Y-coordinate) or the touch operational direction on the Y-axis relative to the switch 12 is determined based on the volume or the shifting direction of the voltage outputted from the electrodes 5D of the front substrate 5. When the touch input section Aa is touch-operated, the X-coordinate of the touch-operated position in the touch input section Aa is determined based on the volume of the voltage outputted from the electrodes 5D of the front substrate 5.

More particularly, when the variable switch 12 is touch-operated, it is possible to specify the operated position or the operational direction relative to the variable switch 12 with the voltage being applied whether between the electrodes 5D of the back substrate 5 or between the electrodes 6D of the front substrate 6. On the other hand, when the touch input section Aa is touch-operated, it is possible to specify the touch-operated position in the touch input section Aa based on the Y-coordinate of the touch-operated position determined by applying voltage between the electrodes 5D of the back substrate 5 and the X-coordinate of the touch-operated position determined by applying voltage between the electrodes 6D of the front substrate 6.

When the protection panel A is provided to the electronic device B such as a digital camera having a photograph function, for example, the variable switch 12 is used as a zoom switch for varying a focal length based on the volume of the voltage varying with the touch-operated position relative to the switch or based on the shifting direction of the voltage varying with the sliding touch operation relative to the switch. When the protection panel A is provided to the electronic device B such as a digital audio player having a music playback function, the variable switch 12 is used as a volume switch for varying the sound volume based on the volume of the voltage varying with the touch-operated position relative to the switch or based on the shifting direction of the voltage varying with the sliding touch operation relative to the switch.

Other Embodiments

[1] The number of the switch 12 or the variable switch 12 provided in the protection panel A can be varied. For instance, a single switch 12, or two or four or more switches may be provided in the protection panel A. Similarly, two or more variable switches 12 may be provided in the protection panel A. It is also possible to provide both the switch 12 and the variable switch 12 in the protection panel A.

[2] The arrangement of the switch 12 or the variable switch 12 in the protection panel A may be varied. For example, the switch 12 may be formed to extend along the upper edge or one of the right and left side edges of the protection panel A. Similarly, the variable switch 12 may be formed to extend along the right side edge or one of the upper and lower edges of the protection panel A. Further, the switch 12 or the variable switch 12 may be formed to extend along plural edges of the protection panel A vertically and transversely. It is also possible to form a plurality of switches 12 or variable switches 12 in rows along one or more of the vertical and transverse edges of the protection panel A.

Figure 8:
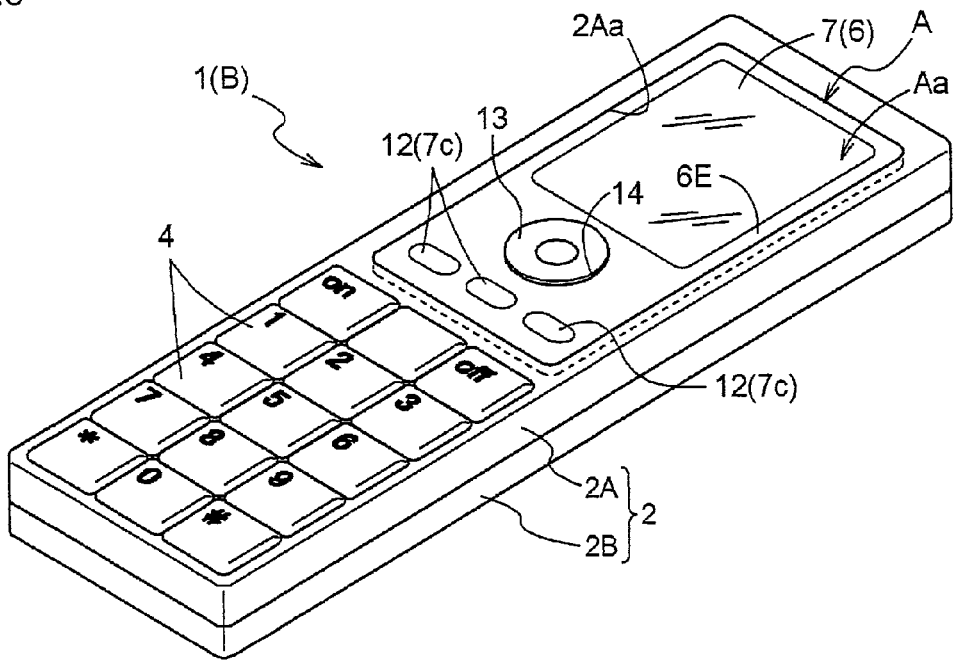
FIG. 8 is a perspective view of the mobile phone showing a construction of the protection panel in another embodiment.

[3] As shown in FIG. 8, the protection panel A may include an opening 14 formed between the touch input section Aa (resistance films 5A and 6A) and the switch 12 (contacts 5G and 6G) or the variable switch 13 (resistance films 51 and 61) for exposing the switch 13 provided in the housing 2 to the outside.

INDUSTRIAL APPLICABILITY

The present invention is applicable to an electronic device comprising a protection panel for allowing the user to perform touch input operations in response to a display while protecting a display part of a display device provided in the electronic device such as a mobile phone, a smartphone, a PDA, car navigation equipment, a digital camera, a digital video camera, a portable gaming device, and a tablet, for example.

The invention claimed is:

1. A protection panel having a touch input function of the analog resistance film method, comprising:
   a back substrate having a front surface provided with a resistance film, a pair of bus bars arranged in opposed sides of the resistance film, a pair of routing circuits each connected to each of the bus bars at one end thereof, and a pair of electrodes each connected to the other end of each of the routine circuits; and
   a front substrate having a back surface provided with a resistance film, a pair of bus bars arranged in opposed sides of the resistance film, a pair of routing circuits each connected to each of the bus bars at one end thereof, and a pair of electrodes each connected to the other end of each of the routine circuits, and a front surface provided with decoration in peripheries thereof, the back substrate and the front substrate being connected to each other to allow the resistance films to face each other at a predetermined distance and to allow either one of the pairs of bus bars to be arranged on opposed sides of the resistance film in an X-axis direction while the other of the pairs of bus bars to be arranged on opposed sides of the resistance film in a Y-axis direction, thereby to form a touch input section for detecting an X-Y coordinate representing an operated position by a potential gradient based on a touch operation relative to the front substrate;
   wherein each of the back substrate and the front substrate includes a plurality of contact members and at least one resistive element connected to each other on the resistance film through the routing circuits,
   wherein the plurality of contact members of each of the back substrate and the front substrate are connected in series while the resistive element is disposed between two adjacent contact members,
   wherein the contact member of the back substrate and the contact member of the front substrate face each other at a predetermined distance when the back substrate and the front substrate are connected to each other, and
   wherein a switch is provided by the contact members facing each other for detecting, when voltage is applied between the electrodes of either one of the front substrate and the back substrate, whether or not the contacts are brought into contact with each other based on voltage detected by the electrodes of the other of the front substrate and the back substrate.

* * * * *

UNITED STATES PATENT AND TRADEMARK OFFICE
CERTIFICATE OF CORRECTION

PATENT NO. : 8,482,537 B2  Page 1 of 1
APPLICATION NO. : 12/674324
DATED : July 9, 2013
INVENTOR(S) : Shimizu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 546 days.

Signed and Sealed this
Eighth Day of September, 2015

Michelle K. Lee
*Director of the United States Patent and Trademark Office*